United States Patent [19]
VanBerg, Jr.

[11] Patent Number: 5,202,194
[45] Date of Patent: Apr. 13, 1993

[54] APPARATUS AND METHOD FOR PROVIDING ELECTRICAL POWER IN A WELL

[75] Inventor: Charles F. VanBerg, Jr., Duncan, Okla.

[73] Assignee: Halliburton Company, Duncan, Okla.

[21] Appl. No.: 713,197

[22] Filed: Jun. 10, 1991

[51] Int. Cl.⁵ .............................................. H01M 8/00
[52] U.S. Cl. ....................................... 429/13; 175/104
[58] Field of Search ..................... 429/13, 47; 175/104

[56] References Cited

U.S. PATENT DOCUMENTS

| | | | |
|---|---|---|---|
| 2,297,254 | 10/1942 | Ennis | 429/42 X |
| 2,643,087 | 6/1953 | Ogorzaly et al. | 175/104 X |
| 3,280,923 | 10/1966 | Muench | 175/104 |
| 3,507,704 | 4/1970 | Webb | 136/86 |
| 3,511,714 | 5/1970 | Bocciarelli | 136/86 |
| 3,664,873 | 5/1972 | Buswell et al. | 136/86 C |
| 3,981,745 | 9/1976 | Stedman | 204/266 |
| 4,250,230 | 2/1981 | Terry | 429/12 |
| 4,629,537 | 12/1986 | Hsu | 204/15 |
| 4,826,742 | 5/1989 | Reiser | 429/33 |
| 4,866,607 | 9/1989 | Anderson et al. | 364/422 |

OTHER PUBLICATIONS

*Fuel Cell Handbook* by A. J. Appley & F. R. Foulkes, published by Van Nostrand Reinhold, Feb. 6, 1990.

Primary Examiner—Stephen Kalafut
Attorney, Agent, or Firm—James R. Duzan; E. Harrison Gilbert, III

[57] ABSTRACT

A power supply for providing electricity to one or more electrical circuits located downhole in a well comprises a fuel cell adapted to be disposed in the well with the electrical circuit(s). In addition to generating electricity, the fuel cell produces a byproduct liquid, such as water, which can be expelled from the power supply into the well despite substantial pressure, such as hydrostatic pressure, in the well. The fuel cell also generates heat which can be dissipated into the well through the wall of a housing of the power supply. The byproduct liquid can be circulated through the fuel cell to accomplish or assist in this heat dissipation.

24 Claims, 1 Drawing Sheet

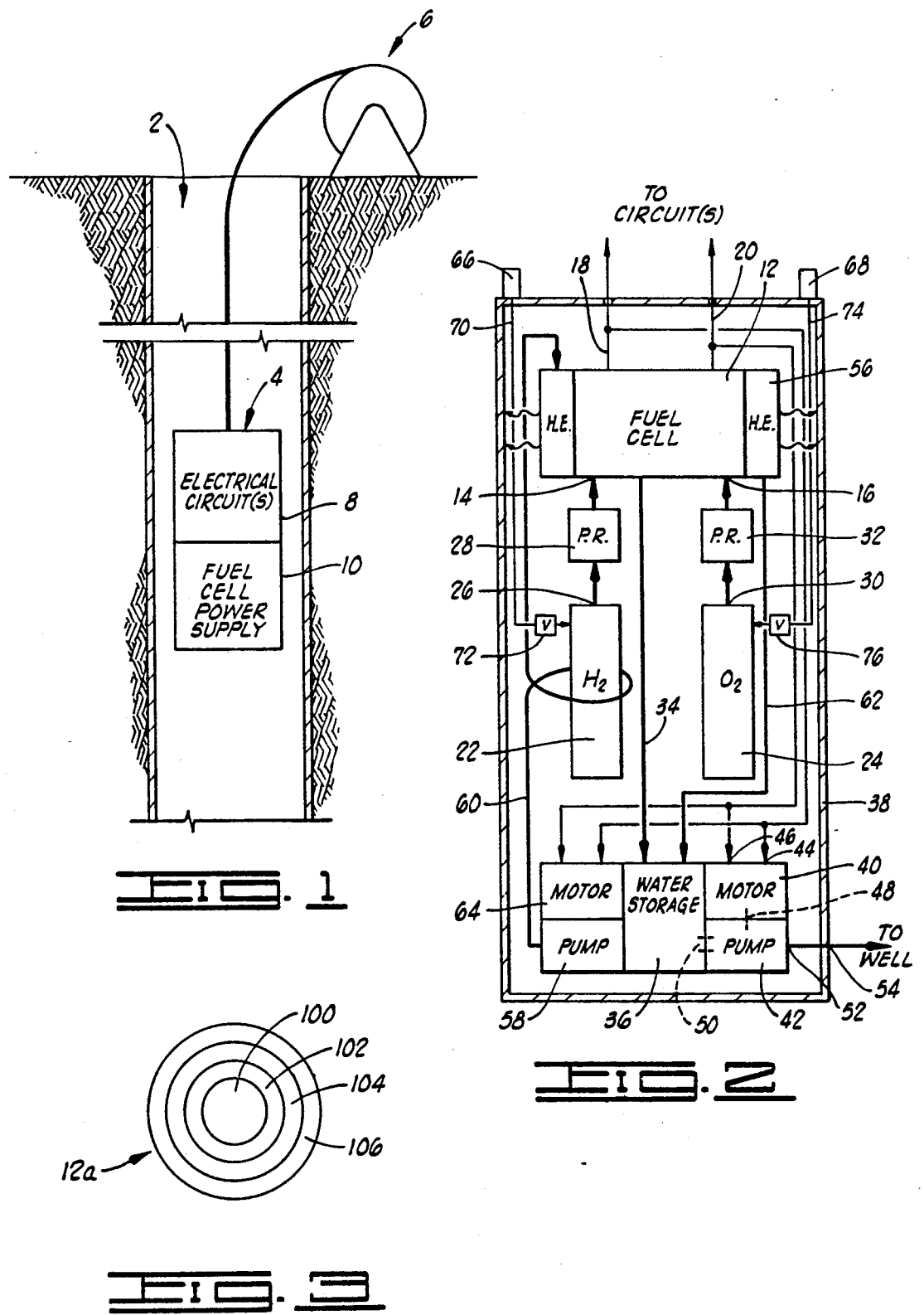

APPARATUS AND METHOD FOR PROVIDING ELECTRICAL POWER IN A WELL

BACKGROUND OF THE INVENTION

This invention relates generally to apparatus and methods for providing electrical power to electrical circuits located down in a well. The invention relates in a particular aspect to a power supply for, and related method of providing electricity to, one or more electrical circuits disposed in a well having a downhole temperature within the range between about 300° F. and about 400° F. and having a minimum diameter of about 6 inches through which the power supply is to be lowered with the electrical circuit(s).

In drilling and completing oil and gas wells or geothermal wells, for example, tools which have electrical circuits typically need to be lowered into the borehole such as for taking measurements of pressure and temperature, for example. Electricity must be provided to these circuits for them to operate.

One manner of providing electricity downhole in a well includes lowering the tool on a wireline and conducting energizing electricity through one or more conductors in the wireline from the surface to the tool positioned downhole. This technique is not always desirable because it is relatively complex in that it requires the wireline to be passed through the wellhead closure equipment at the mouth of the well. This can create safety problems. Furthermore, at least in deep wells, there can be significant energy loss caused by the resistance or impedance of a long wireline conductor.

Another way to provide electricity to downhole electrical circuits utilizes batteries housed with the electrical circuits in the downhole assembly For example, lithium-thionyl-chloride batteries have been used with downhole tools. A shortcoming of batteries, however, is that they cannot provide moderate (and higher) amounts of electrical energy (e.g., 30 kilowatt-hours) at the elevated temperatures encountered in petroleum and geothermal wells.

Because downhole tools having electrical circuits are extensively used in at least the oil and gas industry, there is the need for an improved apparatus and method for providing electricity to such circuits when they are in a well. Such apparatus and method should be localized with the electrical circuits to overcome the noted shortcomings of the wireline technique, and they should provide desired levels of electrical energy at the elevated downhole temperatures to overcome the noted shortcoming of conventional batteries.

SUMMARY OF THE INVENTION

The present invention overcomes the above-noted and other shortcomings of the prior art by providing a novel and improved apparatus and method for providing electricity in a well. The present invention can provide desired amounts of electrical energy within the elevated temperature environments encountered in petroleum and geothermal wells. The apparatus of the present invention is compact enough to fit downhole with the electrical circuits so that it generates and applies electricity locally to the downhole circuits whereby a wireline need not be used.

The present invention generates heat in addition to electricity; however, the present invention also generates a byproduct which can be used to dissipate the generated heat. The present invention also provides for expelling any excess of this byproduct into the downhole region of the well where the invention is used.

The downhole apparatus of the present invention comprises a tool adapted to be lowered into a well, which tool includes at least one electrical circuit requiring electricity. The downhole apparatus further comprises a power supply connected to the at least one electrical circuit for providing electricity thereto, which power supply includes a fuel cell for generating electricity downhole in the well when the tool and the power supply are disposed in the well. The power supply can further include pump means for pumping a byproduct liquid or gas (e.g., steam), produced in the fuel cell, out into the well. The power supply can still further include heat exchanger means for conducting heat away from the fuel cell, which heat exchanger means includes means for circulating at least a portion of the byproduct liquid or gas produced in the fuel cell or a liquid such as ethylene glycol through the fuel cell.

The present invention also provides a method of energizing an electrical circuit of a downhole tool in a well, comprising: (a) lowering into the well with the downhole tool a power supply comprising a fuel cell electrically connected to the electrical circuit of the downhole tool; and (b) producing electricity in the well from the fuel cell and providing at least a portion of the electricity to the electrical circuit of the downhole tool. In the preferred embodiment the foregoing step (b) includes producing a liquid in conjunction with producing electricity, and the inventive method further comprises pumping at least a portion of the liquid out into the well. The method can further comprise dissipating heat from the fuel cell, including circulating at least a portion of the liquid or gas produced in the fuel cell or an included coolant through the fuel cell.

Therefore, from the foregoing, it is a general object of the present invention to provide a novel and improved apparatus and method for providing electricity in a well. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 1 is a schematic drawing representing a downhole apparatus having a tool with one or more electrical circuits and further having a locally disposed fuel cell power supply connected to the one or more electrical circuits in accordance with the present invention.

FIG. 2 is a block diagram of the preferred embodiment of the fuel cell power supply represented in FIG. 1.

FIG. 3 is a schematic cross-sectional plan view of a concentric cylindrical layout for a fuel cell of the power supply.

DETAILED DESCRIPTION OF PREFERRED EMBODIMENT

Referring to FIG. 1, there is represented a well 2 in which a downhole apparatus 4 is disposed in conventional fashion on hoisting equipment 6.

The well 2 represents an oil, gas or geothermal well in the preferred embodiment of the present invention. The well 2 can be open, cased or lined as known in the art. Regardless of the specific interior, however, the well 2 has a minimum diameter of about 6 inches with regard to the preferred embodiment. In the vicinities where the downhole apparatus 4 is to be used, the well 2 has a downhole temperature within the range between about 300° F. and about 400° F.

The downhole apparatus 4 includes a tool 8 which includes at least one electrical circuit. The tool 8 is adapted to be lowered into the well 2 as represented in FIG. 1. An example of a tool having electrical circuits is described in U.S. Pat. No. 4,866,607 to Anderson et al., entitled Self-Contained Downhole Gauge System, which patent is incorporated herein by reference.

The downhole apparatus 4 also includes a power supply 10 for providing electricity to the electrical circuit(s) to which the power supply 10 is connected. The power supply 10 includes a fuel cell 12 (FIG. 2) for generating electricity downhole in the well 2 when the tool 8 and the power supply 10 are disposed in the well 2. The power supply 10 can be housed with or separately from the tool 8; however, the power supply 10 is connected so that it is moved downhole with the tool 8 and so that it is in electrical contact with the one or more electrical circuits in the tool 8.

The hoisting equipment 6 is any suitable means known in the art. For example, the hoisting equipment can include a string of pipe which is assembled, lowered, raised and disassembled in a manner known in the art. Another example of the hoisting equipment 6 includes a coiled tubing string Although not preferred for the reasons given above, the hoisting equipment can include a wireline. Regardless of the specific equipment used, the hoisting equipment is used to lower and raise the downhole apparatus 4 into and out of the well 2. The hoisting equipment 6 can also be adapted to disengage from the downhole apparatus 4 to leave the downhole apparatus 4 in the well 2 if desired or needed.

Referring to FIG. 2 the preferred embodiment of the power supply 10 will be described. It is to be noted that the positioning of the components illustrated in FIG. 2 is not necessarily representative of actual positioning within a specific construction. Actual positioning depends on particular design criteria used as will be apparent to those skilled in the art.

The power supply 10 includes the fuel cell 12. The fuel cell 12 of the preferred embodiment is a conventional device in that it is an electrochemical cell that can continuously change the chemical energy of a fuel and oxidant to electric energy by an isothermal process involving an essentially invariant electrode electrolyte system as known in the art. In the preferred embodiment the fuel cell 12 is of a type which can generate the required electrical energy at the elevated temperatures encountered in the well 2. One particularly suitable type is a phosphoric acid fuel cell which, in response to a chemical reaction with hydrogen and oxygen, generates up to about 2 kilowatt-hours of electrical energy a temperatures within the range mentioned above for the well 2.

The fuel cell 12 includes two inlets 14, 16 for receiving the fuel and the oxidant. The fuel cell also includes two electrical terminals 18, 20 through which the generated electricity is provided. Although any suitable configuration of fuel cell components adapted to fit in the small space (e.g., 1" diameter) available for the fuel cell in the downhole environment can be used, it is contemplated that a concentric cylindrical configuration is particularly suitable. Referring to FIG. 3, the contemplated preferred embodiment fuel cell 12a includes an axial opening 100 around which an annular chamber 102 is concentrically defined for receiving one of the fuel or oxidant substances. The fuel cell elements (i.e., the electrodes and electrolyte) are disposed in an annular region 104, around which an annular concentric chamber 106 is defined for receiving the other of the fuel or oxidant. One or more cooling tubes (not shown) can pass through the axial opening 100 to dissipate heat generated during operation of the fuel cell, and conduits for conducting the fuel and the oxidant to their respective chambers can be run in or through the opening 100.

Referring again to FIG. 2, the electricity is generated in response to a chemical reaction including a fuel and an oxidant as previously mentioned. In the preferred embodiment the fuel is hydrogen and the oxidant is oxygen. The hydrogen is stored as compressed hydrogen gas in a suitable pressure container 22, and the oxygen is stored as compressed oxygen gas in a suitable pressure container 24. The containers 22, 24 can be conventional gas canisters or bottles known in the art; but they must have a sufficiently small diameter (e.g., not greater than about 1 inch) to be accommodated in the narrow downhole environment, yet they must be strong enough to hold the gas under pressure. In the preferred embodiment, the container 22 is implemented with four compressed hydrogen gas bottles providing a total internal storage volume of about 300 cubic inches, and the container 24 is implemented with two compressed oxygen gas bottles providing a total internal storage volume of about 150 cubic inches.

The container 22 has an outlet 26 connected by suitable means to the inlet 14 of the fuel cell 12 so that the hydrogen can be fed into the fuel cell 12. This connector means includes a conventional pressure regulator 28 in the preferred embodiment.

The container 24 has an outlet 30 connected by suitable means to the inlet 16 of the fuel cell 12 so that the oxygen ca be fed into the fuel cell 12. This connector means includes a conventional pressure regulator 32 in the preferred embodiment.

When hydrogen and oxygen are introduced into the fuel cell, a known electrochemical reaction occurs wherein positive hydrogen ions and free electrons are produced. The electrons flow as energizing electrical current through a load connected to the terminals 18, 20. A byproduct liquid, namely water in the preferred embodiment, is also produced as known in the art. To prevent the fuel cell 12 from flooding itself upon startup, a pre-heater (not shown) can be used if needed. For example, heat strips coiled inside the fuel cell 12 and energized by an external power source can be used to pre-heat the fuel cell 12. The external power source can be any suitable source as needed depending upon whether the fuel cell is to be started at the surface or downhole.

The water is conducted through a drain line 34 to a water storage receptacle 36. Because of the small space requirements which must be met in providing the preferred embodiment for use downhole in the well 2, the water storage receptacle 36 has a limited holding capacity (e.g., 0.25 liter). This is not large enough to hold all the water which would be produced during typical usage of the present invention. To compensate for this, the present invention further comprises means for pumping the water from the storage receptacle 36, out of a housing 38 in which the receptacle 36 and the other components of the power supply 10 are contained, and into the well 2.

In the preferred embodiment illustrated in FIG. 2, the pumping means includes a motor 40 and a pump 42. The motor 40 is an electric motor having electrical terminals 44, 46 connected to the terminals 18, 20, respectively, of the fuel cell 12 so that the motor 40 is energized in response to electricity from the fuel cell 12. Because the output of the fuel cell 12 is direct current (d.c.) electricity, the motor 40 is preferably a direct current motor; however, an alternating current (a.c.) motor can be used if a d.c.-to-a c. power converter is used Upon energization, the motor 40 rotates its rotor 48 and thereby drives the pump 42 which is connected to the rotor 48. A contemplated preferred embodiment motor is from TRW Globe.

When driven by the motor 40, the pump 42 pumps water (or whatever byproduot liquid has been produced) from the storage receptacle 36. The water is pumped from an outlet of the receptacle 36, into a fluid inlet of the pump 42 (the coupled outlet and inlet collectively identified in FIG. 2 by the reference numeral 50), and out of a fluid outlet 52 of the pump 42. The outlet 52 is connected to an outlet 54 defined through the housing 38. A contemplated preferred embodiment pump is a small intensifier pump, larger versions of which are made by Halliburton Services.

An important characteristic of the motor 40/pump 42 combination of the preferred embodiment is that it can pump the water from the receptacle 36 at a pressure above the pressure in the well outside the housing 38. This well pressure is typically within the range between about 100 pounds per square inch (psi) and about 20,000 psi. This pressure includes the hydrostatic pressure exerted by a column of fluid in the annulus of the well surrounding the downhole apparatus 4.

In addition to generating electricity and water in the preferred embodiment, the fuel cell 12 generates heat. To prevent this heat from building up in the closed environment within the housing 38 and thereby possibly adversely affecting the operation of the components, the power supply 12 can include heat exchanger means 56 for conducting heat away from the fuel cell 12 and preferably out of the housing 38. The heat exchanger means 56 preferably includes one or more thermally conductive materials for absorbing heat from the fuel cell 12 and for conducting the absorbed heat to the wall of the housing 38, which wall is preferably made of a thermally conductive material which transfers the heat to the external fluid surrounding the downhole apparatus 4 in the well 2. For example, the heat exchanger means can include one or more conduits which conduct a suitable fluid through the fuel cell and then adjacent the wall of the housing 38 so that the fluid absorbs heat from the fuel cell 12 and radiates it to the wall of the housing 38 for dissipation out into the well bore fluid. As illustrated in FIG. 2, the fluid can be water taken from the water storage receptacle 36 via a pump 58 and inlet line 60 and returned to the receptacle 36 via return line 62. The pump 58 is driven by an electric motor 64 energized with electricity from the fuel cell 12. Additional water or other coolants (e.g., ethylene glycol) can be used.

It is contemplated that cooling of the heat exchange medium can also be accomplished at least in part by passing it along one or both of the containers 22, 24 or their outlets which will be cooled as a result of the expansion of the released gases input into the fuel cell 12 This is illustrated in FIG. 2 by the water inlet feed line 60 extending along or around the container 22, for example. The heated water is circulated out of the fuel cell 12 back to the water storage receptacle 36 through the return line 62. Cooling can be effected through the return line 62 also or alternatively.

It is contemplated that other heat exchange techniques can be used. For example, a copper fin structure in the flow stream could be used to lower thermal resistance.

The housing 38 is a suitable structure readily known in the art. In general, the housing 38 is designed for holding the other components described hereinabove with reference to FIG. 2 and for withstanding the heat and pressure encountered in the well 2. A principal criterion is that the housing 38 have a sufficiently small maximum transverse dimension (i.e., a diameter for the typically elongate cylindrical shape) so that the power supply 10 can be lowered downhole with the tool 8. That is, in the preferred embodiment, the maximum diameter of the housing 38 must be less than the minimum diameter of the well 2 referred to hereinabove.

If the housing 38 completely encapsulates the components as illustrated in FIG. 2, suitable connectors are provided through the housing to interface the terminals 18, 20 with the one or more electrical circuits energized by the power supply 10. The other particular features of note with regard to the preferred embodiment are those described hereinabove.

The foregoing apparatus of the present invention is used in accordance with the method of the present invention. This method comprises lowering, via the hoisting equipment 6, the power supply 10 into the well 2 with the tool 8, and producing electricity in the well 2 from the fuel cell 12 within the power supply 10 and providing at least a portion of the electricity to the electrical circuit(s) of the tool 8 through the electrical terminals 18, 20 of the fuel cell 12.

In the preferred embodiment, the electricity is produced by flowing hydrogen into the fuel cell 12 from the container 22 disposed in the well 2 and flowing oxygen into the fuel cell 12 from the container 24 disposed in the well 2. The flows are regulated by presetting the pressure regulators 28, 32 in known manner. The hydrogen and oxygen react in a known manner within the fuel cell 12 so that the electricity is produced and further so that water is produced in the fuel cell 12.

The water drains into the storage receptacle 36. At least a part of the stored water can be pumped out of the power supply 10 and into the annulus surrounding the housing 38 via the pump 42. This pumping is at a pressure exceeding the pressure in the borehole outside the housing 38. At least a part of the stored water can be circulated through the fuel cell 12 to dissipate heat from the fuel cell 12. Heat dissipation can also or alternatively be by other heat exchanger means. Such other heat exchanger means can dissipate heat from the fuel cell 12 through the wall of the housing 38 out into the borehole fluid outside the housing 38.

It is also contemplated that the power supply 10 can be placed permanently downhole. For continued operation in such a permanent installation, the power supply 10 will need to be refueled or recharged from time to time. To refuel, a tubing string can be stabbed into a suitable coupling 66 or 68 in a known manner (FIG. 2) and either fuel or oxidant pumped into the respective container 22 or 24 through the respective coupling 66 or 68 and attached feed line. A feed line 70 having a check valve 72 connects the coupling 66 to the container 22, and a feed line 74 having a check valve 76 connects the coupling 68 to the container 24. The representations of these components in FIG. 2 are only schematic because their actual construction and configuration depend upon, at least in part, where and how the power supply is located downhole. Alternatively, the water can be electrically reconverted to the fuel and oxidant gases, which reconversion process is known in the art. The reconversion energy can be provided via a wireline connected in a known manner.

Thus, the present invention is well adapted to carry out the objects and attain the ends and advantages mentioned above as well as those inherent therein. While the preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. A downhole apparatus, comprising:
    a tool adapted to be lowered into a well, said tool including at least one electrical circuit requiring electricity; and
    a power supply connected to said at least one electrical circuit for providing electricity thereto, said power supply including a fuel cell for generating electricity downhole in the well when said tool and said power supply are disposed in the well.

2. An apparatus as defined in claim 1, wherein said power supply further includes pump means for pumping water, produced in said fuel cell, into the well.

3. An apparatus as defined in claim 2, wherein said power supply further includes heat exchanger means for conducting heat away from said fuel cell, said heat exchanger means including means for circulating a portion of the water produced in said fuel cell through said fuel cell.

4. An apparatus as defined in claim 3, wherein said power supply further includes a container of compressed hydrogen gas and a container of compressed oxygen gas connected to said fuel cell so that hydrogen and oxygen are fed to said fuel cell downhole in the well.

5. An apparatus as defined in claim 4, further comprising a housing having at least said power supply disposed therein, said housing having a maximum outer diameter less than about 6 inches.

6. An apparatus as defined in claim 1, wherein said power supply further includes a container of compressed hydrogen gas and a container of compressed oxygen gas connected to said fuel cell so that hydrogen and oxygen are fed to said fuel cell downhole in the well.

7. An apparatus as defined in claim 6, further comprising a housing having at least said power supply disposed therein, said housing having a maximum outer diameter less than about 6 inches.

8. An apparatus as defined in claim 1, further comprising a housing having at least said power supply disposed therein, said housing having a maximum outer diameter less than about 6 inches.

9. An apparatus as defined in claim 1, wherein said fuel cell is a phosphoric acid fuel cell responsive to hydrogen and oxygen.

10. An apparatus as defined in claim 1, wherein said power supply further includes heat exchanger means for conducting heat away from said fuel cell, said heat exchanger means including means for circulating water produced in said fuel cell through said fuel cell.

11. A power supply for an electrical circuit disposed in a well having a downhole temperature within the range between about 300° F. and about 400° F. and having a minimum diameter of about 6 inches through which said power supply is to be lowered with the electrical circuit, said power supply comprising:
    a fuel cell having a first inlet and a second inlet and having a first terminal and a second terminal, said first and second terminals for connecting to the electrical circuit, and said fuel cell including means for generating electricity in response to a chemical reaction with hydrogen and oxygen;
    a first container having compressed hydrogen gas therein;
    first connector means for connecting said first container to said first inlet of said fuel cell;
    a second container having compressed oxygen gas therein;
    second connector means for connecting said second container to said second inlet of said fuel cell;
    water storage means for storing water produced in said fuel cell in response to hydrogen from said first container reacting in said fuel cell with oxygen from said second container;
    a housing having said fuel cell, said first container, said first connector means, said second container, said second connector means and said water storage means disposed therein, said housing having a maximum outer diameter less than the minimum diameter of the well; and
    means, responsive to electricity from said fuel cell, for pumping water from said water storage means, out of said housing and into the well, said means for pumping disposed in said housing.

12. A power supply as defined in claim 11, further comprising heat exchanger means, disposed in said housing, for conducting heat away from said fuel cell.

13. A power supply as defined in claim 12, wherein said heat exchanger means includes means for circulating water from said water storage means through said fuel cell and back to said water storage means.

14. A power supply as defined in claim 12, wherein said first connector means includes a first pressure regulator, connected to said first container and to said first inlet of said fuel cell; and wherein said second connector means includes a second pressure regulator, connected to said second container and to said second inlet of said fuel cell.

15. A power supply as defined in claim 11, wherein said first connector means includes a first pressure regulator, connected to said first container and to said first inlet of said fuel cell; and wherein said second connector means includes a second pressure regulator, connected to said second container and to said second inlet of said fuel cell.

16. A power supply as defined in claim 11, wherein:
    said housing has an outlet defined therein; and
    said means for pumping includes:
        an electric motor having a rotor and further having electrical terminals connected to said first and second terminals, respectively, of said fuel cell so that said electric motor rotates said rotor in response to electricity from said fuel cell; and
        a pump connected to said rotor of said motor and having a fluid inlet connected to said water storage means and further having a fluid outlet connected to said outlet of said housing.

17. A method of energizing an electrical circuit of a downhole tool in a well, comprising:
(a) lowering into the well with the downhole tool a power supply comprising a fuel cell electrically connected to the electrical circuit of the downhole tool; and
(b) producing electricity in the well from the fuel cell and providing at least a portion of the electricity to the electrical circuit of the downhole tool.

18. A method as defined in claim 17, wherein said step (b) includes flowing hydrogen into the fuel cell from a first container disposed in the well, flowing oxygen into the fuel cell from a second container disposed in the well, and reacting hydrogen and oxygen within the fuel cell so that electricity is produced and further so that water is produced in the fuel cell.

19. A method as defined in claim 18, further comprising pumping at least a portion of the water produced in the fuel cell out into the well.

20. A method as defined in claim 18, further comprising dissipating heat from the fuel cell, including circulating at least a portion of the water produced in the fuel cell through the fuel cell.

21. A method as defined in claim 18, further comprising (c) supplying energy from outside the well to the fuel cell in the well for converting water produced in the fuel cell to hydrogen and oxygen; and repeating said step (b) using the hydrogen and oxygen produced in said step (c).

22. A method as defined in claim 17, wherein:
said step (b) includes producing a liquid in conjunction with producing electricity; and
said method further comprises pumping at least a portion of the liquid out into the well.

23. A method as defined in claim 22, further comprising dissipating heat from the fuel cell, including circulating at least a portion of the liquid produced in the fuel cell through the fuel cell.

24. A method as defined in claim 17, further comprising resupplying fuel from outside the well to the fuel cell in the well, including pumping a fuel and an oxidant downhole to the power supply.

* * * * *